United States Patent
Wang et al.

(10) Patent No.: US 6,670,295 B2
(45) Date of Patent: Dec. 30, 2003

(54) HIGHLY ACTIVE MIDBARREL HYDROCRACKING CATALYST AND THE PREPARATION THEREOF

(75) Inventors: Fenglai Wang, Fushun (CN); Zhengnan Yu, Fushun (CN); Minghua Guan, Fushun (CN); Liting Dong, Fushun (CN)

(73) Assignees: China Petroleum and Chemical Corporation, Beijing (CN); Fushun Research Institute of Petroleum and Petrochemicals Sinopec Corp., Fushun (CN)

( * ) Notice: Subject to any disclaimer, the term of this patent is extended or adjusted under 35 U.S.C. 154(b) by 84 days.

(21) Appl. No.: 09/983,627

(22) Filed: Oct. 25, 2001

(65) Prior Publication Data

US 2002/0094931 A1 Jul. 18, 2002

(30) Foreign Application Priority Data

Oct. 26, 2000 (CH) .......................................... 00123130

(51) Int. Cl.$^7$ ................................................ B01J 29/06
(52) U.S. Cl. .............................. 502/66; 502/60; 502/64; 502/67; 502/74; 502/79
(58) Field of Search ............................. 502/60, 64, 66, 502/67, 74, 79

(56) References Cited

U.S. PATENT DOCUMENTS

| | | | | |
|---|---|---|---|---|
| 4,503,023 A | * | 3/1985 | Breck et al. | 423/175 |
| 4,711,770 A | * | 12/1987 | Skeels et al. | 423/713 |
| 4,757,041 A | * | 7/1988 | Oleck et al. | 502/65 |
| 4,837,396 A | * | 6/1989 | Herbst et al. | 502/67 |
| 4,855,036 A | * | 8/1989 | Chiang et al. | 208/120.15 |
| 4,897,178 A | * | 1/1990 | Best et al. | 208/111.3 |
| 5,160,033 A | * | 11/1992 | Vassilakis et al. | 208/111.15 |
| 5,275,720 A | * | 1/1994 | Ward | 208/111.15 |
| 5,279,726 A | | 1/1994 | Ward | |
| 5,350,501 A | | 9/1994 | Ward | |
| 5,447,623 A | | 9/1995 | Ward | |
| 5,464,527 A | | 11/1995 | Ward | |
| 5,536,687 A | | 7/1996 | Ward | |
| 5,914,290 A | * | 6/1999 | Shi et al. | 502/228 |
| 6,054,113 A | * | 4/2000 | Vaughan et al. | 423/713 |

FOREIGN PATENT DOCUMENTS

JP  8-269464  * 10/1996

* cited by examiner

Primary Examiner—M. Alexandra Elve
Assistant Examiner—Christina Ildebrando
(74) Attorney, Agent, or Firm—Birch Stewart Kolasch & Birch LLP

(57) ABSTRACT

The present invention relates to a highly active midbarrel hydrocracking catalyst and a process for the preparation thereof. The support of the catalyst comprises a modified zeolite-Y, a modified zeolite-β, alumina, etc. The composite of the modified zeolite-Y and zeolite-β exhibits a good synergistically catalytic effect. The catalyst prepared by supporting Group VIB and/or Group VIII metal components is useful in the hydrocacking of heavy oils with high content of sulfur and nitrogen to produce high quality middle distillates with maximum output. The activity of and selectivity to middle distillates of the catalyst are remarkably raised simultaneously. Moreover, the solidifying point of the produced diesel is remarkably lowered.

30 Claims, No Drawings

HIGHLY ACTIVE MIDBARREL HYDROCRACKING CATALYST AND THE PREPARATION THEREOF

TECHNICAL FIELD

The present invention relates to a hydrocracking catalyst and its preparation process, especially a highly active midbarrel hydrocracking catalyst and its preparation process.

BACKGROUND

In recent years, the demand in both domestic and worldwide markets for high quality middle distillate products has been continuously increasing and the gap between supply and demand is getting greater and greater along with the development of the economy. The hydrocracking technology has become an optimum means for producing high quality clean middle distillates through deep processing of heavy oils due to its unique advantages.

At present, the activity of the midbarrel hydrocracking catalyst is not very high, and the solidifying point of the derived diesel with a wide distillation range is relatively high, so it is difficult to attain the objective of further increasing the output of the middle distillate oils by modifying the existing device or increasing the throughput.

The key to the increase in the output of the middle distillates in hydrocracking lies in the development and application of an adequate catalyst. The activity and selectivity to the middle distillates of a hydrocracking catalyst containing a single sort of zeolite can not be raised to a maximum extent due to the restriction of the sort of the zeolite, while the activity and selectivity to the middle distillates of a hydrocracking catalyst containing a composite of zeolites can be remarkably raised since the characteristics of various sorts of zeolites may be fully developed and synergetic catalysis may occur.

U.S. Pat. Nos. 5,536,687, 5,447,623 and 5,350,501 disclose a catalyst containing a zeolite-P and a zeolite-Y which is zeolite UHP-Y (LZ-10), which is prepared by (1) lowering the content of $Na_2O$ to 0.6–5.0 wt. % by partial $NH_4^+$ exchange of the zeolite-NaY, (2) lowering its unit cell size to 24.40–24.64 Å by steam calcination treatment, (3) lowering the content of $Na_2O$ to <0.5 wt. % by the second time $NH_4^+$ exchange, (4) lowering its unit cell size to 24.25–24.35 Å by steam calcination treatment again. The catalyst for producing middle distillates comprises zeolite-Y (1–15 wt. %), zeolite-β (1–15 wt. %), dispersed silica-alumina, alumina, metals W and Ni. Its activity and selectivity to middle distillates are not so high, so it is difficult to meet the need of producers for increasing the processing capacity of the device to further increase the output of middle distillates.

U.S. Pat. No. 5,279,726 discloses a hydrocracking catalyst containing a zeolite-β and the use thereof, which catalyst contains a zeolite-β and a zeolite-Y which is a ultra-stable zeolite-Y (LZY-82, LZY-84) with a unit cell size of 24.52–24.59 Å. The catalyst for producing middle distillates contains zeolite-Y and zeolite-β of 2.5–15 wt. % respectively. The zeolite-Y of the catalyst has a large unit cell size and strong acidity, which is unfavorable to the increase in the selectivity of the catalyst to middle distillates.

U.S. Pat. No. 5,160,033 discloses a hydrocracking catalyst for improving the octane number of gasoline and a process for the preparation thereof, which catalyst takes a zeolite-Y and a zeolite-β as the acidic components and is mainly used in the isomerization of alkanes. The zeolite-β is calcined to weaken its acidity, and the zeolite-Y is a ultra-stable zeolite Y-85 with a silica to alumina ratio of 6.5–20 and a unit cell size of 24.34–24.58 Å. The catalyst contains 10–30% of zeolite-β based on the total amount of the zeolites. This catalyst is mainly used in the isomerization of alkanes in gasoline.

U.S. Pat. No. 5,464,527 discloses a hydrocracking catalyst for raising the selectivity to middle distillates (turbine fuel+diesel), which catalyst uses a ultrahydrophobic zeolite-Y exchanged with rare earth (LZ-10) and dispersed silica-alumina as cracking components, and the metals W and Ni as hydrogenation metal components. This catalyst has a high selectivity to middle distillates, but its reaction temperature is still high.

THE DISCLOSURE OF THE INVENTION

The object of the present invention is to overcome the drawbacks of the prior catalysts and to develop a hydrocracking catalyst with a high activity and high yield to middle distillates.

The inventors have now surprisingly discovered a hydrocracking catalyst which has an activity higher than those of the prior midbarrel catalysts, and a remarkably increased selectivity to middle distillates. The solidifying point of the produced diesel distillate is lowered. This catalyst can meet the need of the refineries for increasing the throughput and further increasing the output of the middle distillates.

The hydrocracking catalyst of present invention comprises zeolites, amorphous silica-alumina and alumina as a support, Group VIII metal(s) and/or Group VIB metal(s) as active components; and comprises, on the basis of the catalyst weight, 4%–28%, preferably 4%–25% of a modified zeolite-Y and 4%–28%, preferably 4%–18% of a modified zeolite-β, wherein said zeolite-Y has a relative crystallinity of higher than 95%, preferably 100%–105%; a silica/alumina molar ratio of 9.0–30.6, preferably 10–20; an infrared acid of 0.30–0.90 mmol/g with more than 95% of Bronsted acid; an unit cell size of $24.25 \times 10^{-10}$ m–$24.45 \times 10^{-10}$ m; a $Na_2O$ weight content of less than 0.16%, preferably less than 0.1%. Said modified zeolite-β has a silica/alumina molar ratio of 85–153, preferably 102–136; a $Na_2O$ weight content of less than 0.15%, preferably less than 0.1%; a relative crystallinity of 100–110% and an infrared acid of 0.1–0.4 mmol/g, preferably 0.2–0.3 mmol/g.

Said zeolite-Y preferably has a specific surface area of 680–850 $m^2/g$, and a pore volume of 0.30–0.55 ml/g; said modified zeolite-p preferably has a specific surface area of 400–750 $m^2/g$, more preferably 500–600 $m^2/g$, and a pore volume of 0.25–0.50 ml/g, preferably 0.3–0.4 ml/g.

Said catalyst generally comprises amorphous silica-alumina of 0–32%, preferably 10%–28%; macroporous alumina of 0–32%, preferably 7%–28%; microporous alumina of 12–18%, preferably 13%–16%; Group VIB metal(s) of 15%–30%, preferably 18%–27%; Group VIII metal(s) of 3%–8%, preferably 4%–7%.

The aforesaid modified zeolite-Y may be derived by modification of zeolite-SSY. Particularly, said modified zeolite-Y may be prepared by calcining the zeolite-SSY in the presence of steam at a temperature of 500° C.–750° C., preferably 550° C.–650° C. under a vapor pressure of 0.01–0.30 MPa, preferably 0.05–0.20 MPa for 0.5–4 hours, preferably 1–2 hours.

Said zeolite-SSY may be prepared by
(1) mixing a starting material of zeolite-Y (i.e., zeolite $NH_4NaY$ or NaY) with water to form a slurry of the zeolite, the concentration of which is that per 100 ml slurry contains 5–30 g, preferably 10–25 g of the starting material of zeolite-Y;

(2) heating the mixture of step (1) to a temperature of 50–120° C., preferably 70–100° C.;

(3) adding thereto the crystal ammonium hexafluorosilicate or a solution thereof, and reacting with stirring the mixture for 0.1–24 hours, preferably 0.5–5 hours; and (4) separating the product, which is then filtered, washed with water, and dried to obtain said zeolite-SSY; wherein in step (1) the starting material of zeolite-Y is preferably zeolite $NH_4NaY$ with its $Na_2O$ content of less than 5.0% by weight, and its silica/alumina molar ratio of 3.5–7.0, preferably 4.5–7.0; and in step (3) the amount of the added ammonium hexafluorosilicate is at least 10 g, preferably 20–50 g relative to per 100 g starting material of zeolite-Y; and the addition rate is up to 30 g, preferably 5–25 g per hour relative to 100 g of the starting material of zeolite-Y.

The zeolite-SSY with low $Na_2O$ content and high crystallinity is obtained directly by the above process.

The aforesaid modified zeolite-p may be a new one derived by the following highly efficient synthesis process, which comprises the steps that (1) a slurry of a completely crystallized zeolite-β is directly subjected to ammonium salt exchange;

(2) the ammonium salt exchanged zeolite-β is filtered, washed with water, dried and calcined;

(3) the calcined, deammoniated zeolite-β is treated with an acid; and (4) the acid treated zeolite-P is subjected to a pressurized steam calcination treatment.

In aforesaid step (1), the completely crystallized zeolite-β is generally synthesized by hydrothermal synthesis with an organic amine as a template, said crystallized zeolite-P generally has $SiO_2/Al_2O_3$ ratio of 42–51 and $Na_2O$ content of 3.0 wt. %–4.0 wt. %. The characteristic of step (1) is to combine the mother liquor separation with ammonium salt exchange into one step, wherein the original slurry is diluted with pure water to a solid/liquid ratio of 1:8–1:15 by weight and then an ammonium salt is added to make its concentration in the solution attain 0.1–10.0 mol/l, preferably 0.5–5.0 mol/l. Then the ammonium salt exchange is carried out. The ammonium salts used may be ammonium nitrate, ammonium chloride, ammonium sulfate, etc. The solution is fully stirred while conducting the exchange, and the temperature is maintained in a range from room temperature to 100° C. for 0.5–5.0 h, preferably 1.0–3.0 h. The concentration of the zeolite in the slurry is controlled in 0.01–1.0 g/ml, preferably 0.05–0.5 giml so that the $Na_2O$ content in the exchanged zeolite does not exceed 0.5% by weight. The requirement can usually be fulfilled when step (1) is carried out twice.

In aforesaid step (2) the ammonium salt exchanged zeolite-β is generally filtered, washed with water, dried to a weight content $\geq 80\%$ on dry basis, and then subjected to deammoniation by calcination. Said calcination is preferably carried out stepwise in a calcination furnace with air flowing therethrough. The first step of calcination is carried out at 150° C.–250° C. for 2.0–4.0 h to remove the remaining water, the second step at 250° C.–450° C. for 4.0–6.0 h to decompose the organic amine, and the third step at 450° C.–650° C. for 5.0–15.0 h to remove the free carbon.

In aforesaid step (3) the acid treatment is generally carried out with fully stirring with an inorganic acid of 0.05–10.0 moll, preferably 0.1–5.0 mol/l. The particular conditions are: temperature 20° C.–100° C.; duration 0.5–5.0 h, preferably 1.0–3.0 h; the concentration of the zeolite in the slurry 0.01–1.0 g/ml, preferably 0.05–0.5 g/ml; the pH value of the slurry is controlled at 1.5–3.5, The inorganic acid used can be hydrochloric acid, nitric acid, sulfuric acid, etc.

In aforesaid step (4) the pressurized steam calcination treatment is generally carried out by putting the acid treated sample in a sealed steam calcination treatment furnace and raising the temperature to 500° C.–800° C. with a heating rate of 100–600° C./h, preferably 200–400° C./h. The temperature for the steam calcination treatment is preferably 550° C.–630° C. and the pressure of the system is 0.05–0.50 MPa, preferably 0.10–0.20 MPa. These conditions are maintained for 0.5–5.0 h, preferably for 1–2 h. Then the pressure is released and the temperature is lowered down to yield the modified zeolite-β of the present invention.

In aforesaid step (3), after acid treatment, an ammonium salt may be added to the slurry of the zeolite-β so that the concentration of the ammonium salt in the slurry attains 0.2–0.6 mol/l, and then the slurry is filtered. Said ammonium salts can be ammonium nitrate, ammonium chloride, ammonium carbonate, ammonium sulfate, etc.

In aforesaid step (3) the filtered zeolite-β can be directly calcinated in the presence of steam. It is preferred to dry it to a material of 80 wt. %-90 wt. % on dry basis, then uniformly spray pure water on to said material (0.2–0.6 kg/kg material), and carry out the steam calcination treatment.

The characteristics of the modified zeolite-p prepared by the above process are an adequate acidity, uniform distributed acidic sites, high crystallinity, and possession of more secondary pores and a small amount of non-framework aluminum.

The content of $SiO_2$ in the amorphous silica-alumina according to the present invention is 20%–75%, preferably 35%–60% by weight, and the content of $Al_2O_3$ is 25%–80%, preferably 40%–65% by weight. The pore volume of the amorphous silica-alumina is 0.5–1.1 ml/g, preferably 0.6–0.8 ml/g. The specific surface area is 200–500 $m^2/g$, preferably 280–500 $m^2/g$. Said amorphous silica-alumina of the present invention may be prepared by coprecipitation or graft copolymerization.

The metals of Group VIII of the present invention are preferably Co and/or Ni, and the metals of Group VIB are preferably Mo and/or W.

The pore volume of the macroporous alumina used in the present invention is 0.6–1.2 ml/g, preferably 0.8–1.2 ml/g, and the specific surface area is 200–550 $m^2/g$, preferably 300–500 $m^2/g$.

The microporous alumina used in the present invention is used as a binder after peptization by inorganic and/or organic acids in the preparation of the catalyst. The pore volume of said microporous alumina is 0.3–0.5 ml/g and the specific surface is 180–350 $m^2/g$. The inorganic acids used can be HCl, $HNO_3$, $H_3PO_4$, or $H_2SO_4$, preferably $HNO_3$ or $H_3PO_4$, and the organic acids can be acetic acid, propanoic acid, ethane diacid, and citric acid. When the binder is made, the ratio of the inorganic and/or organic acids to the microporous alumina (mol/mol) is generally 0.10–0.50, preferably 0.20–0.35.

The specific surface area of the catalyst of the present invention is 200–360 $m^2/g$, and the pore volume is 0.30–0.50 ml/g.

The highly active midbarrel hydrocracking catalyst of the present invention may be prepared in the following steps:

(1) mixing the modified zeolite-Y, modified zeolite-β, optional amorphous silica-alumina and macroporous alumina, microporous alumina, and extrusion aid, forming by extrusion, and drying;

(2) calcining the dried extrudates prepared in step (1) to form a support;

(3) impregnating the support prepared in step (2) with a solution containing active metal components, then drying, calcining to yield the catalyst of the present invention.

Particularly, the catalyst may be prepared as follows:

The modified zeolite-Y, modified zeolite-β, optional amorphous silica-alumina and macroporous alumina, and extrusion aid are put into a comulling machine and comulled for 20–40 min. Then the microporous alumina is added and the comulling is continued for 25–40 min. Consequently, a certain amount of industrially pure water is added to the comulled material and the comulling is continued until the mixture becomes an extrudable paste. Now the content of dry basis in the paste is 38%–52% by weight of the whole paste. The paste is formed by extrusion, dried and made into dry bars. The dry bars are heated to 500° C.–700° C. along programmed temperature and calcined for 2.5–6 h.

Active metal components are at least one of the metals of Group VIB and at least one of the non-noble metal of Group VIII. In particular, Group VIII metals are preferably Co and/or Ni, and Group VIB metals are preferably Mo and/or W. Tungsten compounds used to prepare the solution are preferably ammonium metatungstate and/or tungstic acid and the molybdenum compounds may be one or more of various ammonium molybdates, molybdic acids and molybdenum oxides. Nickel compounds can be one or more of nickel nitrate, nickel acetate, and nickel basic carbonate. Cobalt compounds can be cobalt nitrate and/or cobalt acetate. Impregnation aids may be present in the impregnation solution and they can be inorganic acids, organic acids and/or salts of organic acids. The inorganic acids can be phosphoric acid, nitric acid etc, and the organic acids can be formic acid, acetic acid, citric acid, etc. The salts of organic acids can be ammonium formate, ammonium acetate, and ammonium citrate, etc.

The processes for impregnating the support can be saturation impregnation, supersaturating impregnation, or complexing impregnation. The duration of the impregnation is 1–12 h. The impregnated support is dried at 100° C.–150° C. for 1–12 h. The dried catalyst is calcined at 450° C.–550° C. for 2.5–6.0 h to yield the catalyst of the present invention.

The catalyst of the present invention is useful in the hydrocracking of heavy oils for producing middle distillates with a maximum output, especially in the production of high quality middle distillates by hydrocracking heavy oils with at least 50 v % of the distillate having a boiling range of 426° C.–551° C., a total sulfur content of 1.5%–3.0% by weight, and a total nitrogen content of 1300–2000 µg/g.

When the catalyst according to the present invention is used in the hydrocracking of heavy oils for producing middle distillates, its activity is 8° C-13° C. higher than that of the prior midbarrel hydrocracking catalyst, and the selectivity to middle distillates is over 1.5 wt. % higher. The solidifying point of the produced diesel is lowered by 6° C.–9° C. The hydrogenation performance of the catalyst prepared according to the present invention is excellent, and the middle distillate products are high quality jet fuel and diesel.

The catalyst of the present invention and the process for the preparation thereof will be described in more detail in the following examples which should not be construed as any limitation to the protection scope of the appended claims.

EXAMPLE 1

1333 g starting material zeolite $NH_4NaY$ with a $Na_2O$ content of 4.5% by weight, a silica/alumina molar ratio of 5.0 and dry material of 75% by weight was added into a stainless steel barrel, the mixture was made with 4.5 l distilled water to form a slurry which was heated with stirring to 90° C., and then a solution of 550 g ammonium hexaflurosilicate in 3000 ml distilled water was added dropwise to the slurry over 2 hours. After addition, the mixture was stirred at 90° C. for 1.5 hours, and then put aside without stirring for about 10 mins. The product zeolite-SSY was separated, filtered, washed with water and dried. Thus obtained zeolite-SSY was calcined at 550° C. under a vapor pressure of 0.05 MPa for 40 mins to yield the zeolite-SSY of the present invention numbered SSY1.

EXAMPLE 2

1333 g starting material zeolite $NH_4NaY$ with a $Na_2O$ content of 4.0% by weight, a silica/alumina molar ratio of 5.0 and dry material of 75% by weight was added into a stainless steel barrel, the mixture was made with 7.5 l distilled water to form a slurry which was heated with stirring to 90° C., and then 500 g crystal ammonium hexafluorosilicate was uniformly added to the slurry over 2 hours. After addition, the mixture was stirred at 90° C. for 4 hours, and then put aside without stirring for about 10 mins. The product zeolite-SSY was separated, filtered, washed with water and dried. Thus obtained zeolite-SSY was calcined at 580° C. under a vapor pressure of 0.10 MPa for 60 mins to yield the zeolite-SSY of the present invention numbered SSY2.

EXAMPLE 3

1333 g starting material zeolite $NH_4NaY$ with a $Na_2O$ content of 4.0% by weight, a silica/alumina molar ratio of 5.5 and dry material of 75% by weight was added into a stainless steel barrel, the mixture was made with 5.5 l distilled water to form a slurry which was heated with stirring to 95° C., and then a solution of 410 g ammonium hexafluorosilicate in 3500 ml distilled water was added dropwise to the slurry over 2 hours. After addition, the mixture was stirred at 95° C. for 2 hours, and then put aside without stirring for about 10 mins. The product zeolite-SSY was separated, filtered, washed with water and dried. Thus obtained zeolite-SSY was calcined at 600° C. under a vapor pressure of 0.15 MPa for 90 mins to yield the zeolite-SSY of the present invention numbered SSY3.

EXAMPLE 4

1333 g starting material zeolite $NH_4NaY$ with a $Na_2O$ content of 3.0% by weight, a silica/alumina molar ratio of 5.5 and dry material of 75% by weight was added into a stainless steel barrel, the mixture was made with 5.5 l distilled water to form a slurry which was heated with stirring to 95° C., and then a solution of 390 g ammonium hexafluorosilicate in 3800 ml distilled water was added dropwise to the slurry over 2 hours. After addition, the mixture was stirred at 95° C. for 3 hours, and then put aside without stirring for about 10 mins. The product zeolite-SSY was separated, filtered, washed with water and dried. Thus obtained zeolite-SSY was calcined at 650° C. under a vapor pressure of 0.20 MPa for 110 mins to yield the zeolite-SSY of the present invention numbered SSY4.

The physico-chemical properties of the zeolites obtained in Examples 14 are shown in Table 1.

TABLE 1

Major physico-chemical properties of the modified Zeolite-SSYs

| Example No. | 1 | 2 | 3 | 4 |
|---|---|---|---|---|
| Zeolite No. | SSY1 | SSY2 | SSY3 | SSY4 |
| $SiO_2/Al_2O_3$ (molar ratio) | 15.8 | 13.9 | 12.8 | 11.9 |
| $Na_2O$ content (wt. %) | 0.10 | 0.09 | 0.08 | 0.05 |
| Relative crystallinity | 105 | 104 | 102 | 100 |
| Specific surface area (m²/g) | 768 | 738 | 704 | 697 |
| Pore volume (ml/g) | 0.388 | 0.362 | 0.316 | 0.304 |
| Unit cell size (Å) | 24.42 | 24.37 | 24.33 | 24.29 |
| Infrared acidity (mmol/g) | 0.806 | 0.684 | 0.482 | 0.322 |

EXAMPLE 5

(1) 2000 ml of a slurry of an industrially synthesized zeolite-Naβ containing 400 g of solid and with a $SiO_2/Al_2O_3$ ratio of 47.1 and a $Na_2O$ content of 3.7 wt. %, was diluted with industrially pure water to a solid/liquid ratio of 1:10, and ammonium nitrate was added thereto until its concentration in the slurry reached 2.0 mol/l. The slurry was heated to 95° C. and maintained at this temperature for 2 h with stirring. Then the slurry was cooled down to 60° C. and filtered. The wet filter cake was exchanged for the second time under the same conditions as the first time.

(2) The zeolite-β, which was exchanged with ammonium salt twice, was washed until the pH of the solution reached 6, then put into a drying box and dried at 110° C. for 6 h.

(3) The dried zeolite-β was put into a muffle and heated to 250° C. within 1 h. The temperature was maintained constant for 2 h, then raised to 400° C. within 1 h. The temperature was maintained constant for 4 h, and finally raised to 540° C. The temperature was maintained constant for 10 h. The material became white completely and the carbon residue was less than 0.2 wt. %.

(4) The high temperature deammoniated zeolite-β was crashed, 300 g of which was weighed. To the crashed zeolite-β was added 3000 ml of 0.4 mol/l HCl, and the temperature of the slurry was raised to 80° C. while stirring. The slurry was maintained constant at 80° C. for 2 h with stirring, then cooled, filtered and washed till no Cl⁻ can be detected in the filtrate.

(5) The wet filter cake derived after filtration and washing of the acid treated zeolite-β was placed in a sealed steam calcination treatment furnace and the temperature was raised to 620° C. at a heating rate of 200° C./h. The temperature was kept constant at 620° C. for 2 h while the vapor pressure being constant at 0.20 MPa. Then the temperature was allowed to go down naturally, to yield the zeolite-β (numbered herein as β1) of the present invention.

EXAMPLE 6

(1) 2000 ml of a slurry of an industrially synthesized zeolite-Naβ having a $SiO_2/Al_2O_3$ ratio of 47.1 and a $Na_2O$ content of 3.7 wt. % and containing 400 g of solid, was diluted with industrially pure water to a solid/liquid ratio of 1:13. 1 mol/l of ammonium nitrate was used for the first time ammonium salt exchange, while 0.5 mol/l of ammonium nitrate for the second time ammonium salt exchange with the others being the same as in Example 5.

(2) The same as in (2) of Example 5.

(3) The same as in (3) of Example 5.

(4) The high temperature deammoniated zeolite-β was crashed, 200 g of which was weighed. To the crashed zeolite-β was added 2000 ml of 1.0 mol/l HCl, and the temperature was raised to 80° C. while stirring. The slurry was maintained constant at 80° C. for 2 h with stirring, then cooled, filtered and washed till no Cl⁻ ion can be detected in the filtrate.

(5) The temperature was raised to 560° C. at a heating rate of 500° C./h. The temperature was kept constant at 560° C. for 3 h while the vapor pressure being constant at 0.30 MPa and the zeolite-β (numbered herein as β2) of the present invention was obtained.

EXAMPLE 7

(1) An industrial experiment. A mixture of a macroporous silica gel, sodium meta-aluminate, water, and tetraethylamonium hydroxide was placed into a 1000 l crystallization tank for crystallization, the total loading of $SiO_2$ and $Al_2O_3$ contained in said mixture being 286 kg. The molar ratio of sodium oxide:tetraethylamonium hydroxide:silica:water=1.8:2.0:1.0:30:200. While being stirred, the mixture was first heated to 120° C. and maintained at the same temperature for 20 h, and then heated to 150° C. and maintained at the same temperature for 48 h to carry out dynamic crystallization. The slurry of the completely crystallized zeolite-β was quantitatively transferred to an exchange tank. The solid/liquid ratio of the slurry was 1:5, which was diluted with pure water to a solid/liquid ratio of 1:7. $NH_4NO_3$ was added until its concentration in the slurry attained 2.0 mol/l, and the temperature was raised to 95° C. and kept constant for 2 h with stirring. Then the temperature was brought down to 50° C. and the slurry was filtered. The wet filter cake was subjected to the second time ammonium salt exchange, the conditions of which being the same as in the first time exchange.

(2) The zeolite-β subjected to ammonium salt exchange twice was filtered and washed, and then placed in the drying box and dried at 110° C. for 12 h.

(3) The dried zeolite-β was directly deammoniated in a belt calciner. After that, the material turned white completely, and the residue carbon was less than 0.2 wt. %.

(4) The high temperature deammoniated zeolite-β was crashed, 160 kg of which was weighed and placed into a 2000 l exchange tank. To the tank was added 1600 l of 0.4 mol/HCl, and the temperature of the slurry was raised to 80° C. while stirring. The slurry was maintained at 80° C. for 2 h with stirring, then cooled, filtered and washed till no Cl⁻ ion can be detected in the filtrate.

(5) The same as in step (5) of Example 5. The zeolite-β (numbered herein as β3) of the present invention was obtained.

EXAMPLE 8

(1) An industrial experiment. The conditions and procedures for crystallization were the same as in Example 7. After crystallization, the completely crystallized zeolite-β was quantitatively transferred to an exchange tank. The solid/liquid ratio of the slurry was 1:5, which was diluted with pure water to a solid/liquid ratio of 1:10. $NH_4NO_3$ was added until its concentration in the slurry attained 2.0 mol/l, and the temperature was raised to 95° C. and kept constant for 2 h with stirring. Then the temperature was brought down to 50° C. and the slurry was filtered. The wet filter cake was subjected to the second time ammonium salt exchange, the exchange solution being 0.5 mol/l of $NH_4NO_3$ and the others being the same as in (1) of Example 7.

(2) The same as in (2) of Example 7.

(3) The same as in (3) of Example 7.

(4) The same as in (4) of Example 7.

(5) The same as in (5) of Example 7. The zeolite-β (numbered herein as β4) of the present invention was obtained.

TABLE 2

Major physico-chemical properties of the modified zeolites (β1–β4) of the present invention and the feedstock zeolite-β

| Example No. | 5 | 6 | 7 | 8 | Feedstock |
|---|---|---|---|---|---|
| Zeolite No. | β1 | β2 | β3 | β4 | G |
| $SiO_2/Al_2O_3$ (molar ratio) | 108.8 | 112.2 | 118.5 | 122.7 | 47.1 |
| $Na_2O$ content (wt. %) | 0.05 | 0.04 | 0.04 | 0.03 | 3.7 |
| Specific surface area (m²/g) | 556 | 573 | 561 | 536 | 620 |
| Pore volume (ml/g) | 0.35 | 0.34 | 0.35 | 0.35 | 0.36 |
| Infrared acidity (mmol/g) | 0.201 | 0.265 | 0.280 | 0.235 | 0.935 |

EXAMPLE 9

(1) 2500 ml of a slurry of an industrially synthesized zeolite-Naβ having a $SiO_2/Al_2O_3$ ratio of 47.1 and a $Na_2O$ content of 3.7 wt. %, and containing 500 g of solid was diluted with industrially pure water to a solid/liquid ratio of 1:7, and ammonium nitrate was added thereto until its concentration in the slurry reached 2.0 mol/l. The slurry was heated to 95° C. and maintained at this temperature for 2 h while being stirred. Then the slurry was cooled down to 60° C. and filtered. The wet filter cake was exchanged for the second time under the same conditions as in the first time.

(2) The zeolite-β, which was exchanged with ammonium salt twice, was washed until the pH of the solution reached 6, then put into a drying box and dried at 120° C. for 6 h.

(3) The dried zeolite-β was put into a muffle and heated to 250° C. within 1 h. The temperature was maintained constant for 2 h, then raised to 400° C. within 1 h. and maintained constant for 4 h. Finally the temperature was raised to 540° C. and maintained constant for 10 h. The material became white completely and the carbon residue was less than 0.2 wt. %.

(4) The high temperature deammoniated zeolite-β was crashed, 400 g of which was weighed. To the crashed zeolite-β was added 4000 ml of 0.4 mol/l HCL solution, and the temperature was raised to 80° C. while stirring. The slurry was maintained constant at 80° C. for 2 h with stirring. Then 160 g of solid ammonium nitrate was added to make its concentration in the slurry reach 0.5 mol/l and the stirring was continued for 10 min. Then the slurry was cooled, filtered and washed till no $CL^-$ ion can be detected in the filtrate. (5) The acid treated zeolite-β was filtered and washed, then dried at 120° C. for 6 h (85 wt. % on dry basis).

(6) After uniformly spraying pure water onto the aforesaid dry sample (0.5 kg pure water/kg dry sample), the sample was placed in a sealed steam calcination treatment furnace and the temperature was raised to 600° C. at a heating rate of 200° C./h. The temperature was kept constant at 600° C. for 3 h while the vapor pressure being controlled at 0.20 MPa. Then the temperature was allowed to go down to ambient temperature naturally, and the zeolite-β (numbered herein as β5) of the present invention was obtained.

EXAMPLE 10

(1) 2000 ml of a slurry of an industrially synthesized zeolite-Naβ having a $SiO_2/Al_2O_3$ ratio of 47.1 and a $Na_2O$ content of 3.7 wt. %, and containing 400 g of solid, was diluted with industrially pure water to a solid/liquid ratio of 1:10. 1.0 mol/l of $NH_4NO_3$ solution was used for the first time ammonium salt exchange, while 0.5 mol/l of $NH_4NO_3$ solution was used for the second time ammonium exchange with the others being the same as in Example 9.

(2) The same as in (2) of Example 9.

(3) The same as in (3) of Example 9.

(4) The high temperature deammoniated zeolite-β was crashed, 300 g of which was weighed. To the crashed β zeolite was added 3000 ml of 1.0 mol/l HCl solution, and the temperature of was raised to 80° C. and maintained constant for 2 h while stirring. Then 120 g of solid ammonium nitrate was added to make its concentration in the slurry reach 0.3 mol/l and the stirring was continued for 10 min. Then the slurry was cooled, filtered and washed till no $Cl^-$ ion can be detected in the filtrate.

(5) The acid treated zeolite-β was filtered and washed, then dried at 110° C. for 8 h (83 wt. % on dry basis).

(6) After uniformly spraying pure water onto the aforesaid dry sample (0.4 kg clean water/kg dry sample), the sample was placed in a sealed steam calcination treatment furnace, and the temperature was raised to 560° C. at a heating rate of 500° C./h. The temperature was kept constant at 560° C. for 4 h while the vapor pressure being controlled at 0.30 MPa. Then the temperature was allowed to go down to ambient temperature naturally, and the zeolite-β (numbered herein as β6) of the present invention was obtained.

EXAMPLE 11

(1) An industrial experiment. The conditions and procedures for crystallization were the same as in Example 7. After crystallization, the completely crystallized zeolite-β was quantitatively transferred to the exchange tank. The solid/liquid ratio of the slurry was 1:5, which was diluted with pure water to a solid/liquid ratio of 1:13. $NH_4NO_3$ was added until its concentration in the slurry attained 2.0 mol/l, and the temperature was raised to 95° C. and kept constant for 2 h with stirring. Then the temperature was brought down to 50° C. and the slurry was filtered. The wet filter cake was subjected to the second time ammonium salt exchange, the conditions being the same as the first time.

(2) The zeolite-β subjected to ammonium salt exchange twice, was filtered and washed, then put into a drying box and dried at 110° C. for 12 h.

(3) The dried zeolite-β was directly deammoniated in a belt calciner. After that, the material turned white completely, and the residue carbon was less than 0.2 wt. %.

(4) The high temperature deammoniated zeolite-β was crashed, 160 kg of which was weighed and placed into a 2000 l porcelain exchange tank. To the tank was added 1600 l of 0.4 mol/l HCl solution, and the temperature of the slurry was raised to 80° C. and maintained constant for 2 h with stirring. Then 64 kg of solid ammonium nitrate was added to make its concentration in the slurry attain 0.5 mol/l, and the stirring was continued for 10 min. The slurry was cooled, filtered and washed till no $Cl^-$ ion can be detected in the filtrate.

(5) The acid treated zeolite-β was filtered and washed, then dried at 110° C. for 12 h, the dry basis of which was 87 wt. %.

(6) After uniformly spraying pure water onto the aforesaid dry sample (0.5 kg pure water/kg dry sample), the sample was placed in a sealed steam calcination treatment furnace, and the temperature was raised to 580° C. at a heating rate of 400° C./h. The temperature was kept constant for 3 h while the vapor pressure being controlled at 0.30 MPa. Then the temperature was allowed to go down to ambient temperature naturally, and the zeolite-β (numbered herein as β7) of the present invention was obtained.

EXAMPLE 12

(1) An industrial experiment. The conditions and procedures for crystallization were the same as in Example 7. After crystallization, the slurry of the completely crystallized zeolite-β was quantitatively transferred to the exchange tank. The solid/liquid ratio of the slurry was 1:5, which was then diluted with pure water to a solid/liquid ratio of 1:10. $NH_4NO_3$ was added until its concentration in the slurry attained 2.0 mol/l, and the temperature was raised to 90° C. and kept constant for 2 h with stirring. Then the temperature was brought down to 60° C. and the slurry was filtered. The wet filter cake was subjected to the second time ammonium salt exchange, the concentration of $NH_4NO_3$ in the slurry being 0.5 mol/l. Others were the same as in (1) of Example 11.

(2) The same as (2) of Example 11.
(3) The same as (3) of Example 11.
(4) The high temperature deammoniated zeolite-β was crashed, 160 kg of which was weighed and placed into a 2000 l porcelain exchange tank. To the tank was added 1600 l of 0.6 mol/l HCl solution, and the temperature was raised to 80° C. and maintained constant for 2 h with stirring. Then 64 kg of solid ammonium nitrate was added to make its concentration in the slurry attain 0.5 mol/l, and the stirring was continued for 10 min. The slurry was cooled, filtered and washed.

(5) The filter cake was placed in a sealed steam calcination treatment furnace and the temperature was raised to 560° C. at a heating rate of 200° C./h. The temperature was kept constant for 3.5 h while the vapor pressure being controlled at 0.30 MPa. Then the temperature was allowed to go down to ambient temperature naturally, and the zeolite-β (numbered herein as β8) of the present invention was obtained.

TABLE 3

Major physico-chemical properties of the modified zeolites (β5-β8) of the present invention

| Example No. | 9 | 10 | 11 | 12 |
|---|---|---|---|---|
| Zeolite No. | β5 | β6 | β7 | β8 |
| $SiO_2/Al_2O_3$ (molar ratio) | 115.3 | 118.3 | 120.7 | 115.6 |
| $Na_2O$ content (wt. %) | 0.05 | 0.06 | 0.05 | 0.05 |
| Specific surface area (m²/g) | 536 | 540 | 545 | 528 |
| Pore volume (ml/g) | 0.33 | 0.33 | 0.34 | 0.34 |
| Infrared acidity (mmol/g) | 0.238 | 0.249 | 0.268 | 0.206 |

EXAMPLE 13

61.2 g of the modified zeolite SSY3, 40.0 g of the modified zeolite β5, 64.3 g of amorphous silica-alumina (with a $SiO_2$ content of 50 wt. %, a pore volume of 0.68 ml/g and a specific surface area of 346 m²/g), 132.4 g of macroporous alumina (with a pore volume of 1.0 ml/g and a specific surface area of 398 m²/g) were placed in a comulling machine and comulled for 30 min. Then 253.8 g of a binder (containing 26 wt. % of microporous alumina and the nitric acid to alumina molar ratio is 0.25) was added and comulled for 30 min. Afterwards, 98 ml of water was added and the comulling was continued until an extrudable paste was formed. The paste was extruded into bars, which were dried at 110° C. for 6 h and then heated to 580° C. along programmed temperature and calcined for 4 h to yield the support. The support was impregnated with an impregnation solution containing tungsten and nickel ($WO_3$ concentration is 51.3 g/100 ml, NiO concentration is 14.8 g/100 ml) at ambient temperature for 2 h and dried at 120° C. for 6 h. The sample was heated to 480° C. along programmed temperature and calcined for 4 h to yield catalyst A, the physico-chemical properties of which are shown in Table 4.

EXAMPLE 14

45.9 g of the modified zeolite SSY2, 46.2 g of modified zeolite β6, 171.4 g of amorphous silica-alumina, 44.1 g of macroporous alumina were placed in a comulling machine and comulled for 20 min. Then 230.8 g of a binder was added and the comulling was continued for 40 min. Afterwards, 65 ml of water was added and the comulling was carried out until an extrudable paste was formed. The paste was extruded into bars and the bars were dried at 140° C. for 3 h. The properties of the amorphous silica-alumina, macroporous alumina, and binder were the same as in Example 13. The dried bars were heated to 530° C. along programmed temperature, and calcined for 5 h to yield the support. The support was impregnated with an impregnation solution containing tungsten and nickel (the concentrations were the same as in Example 13) at ambient temperature for 4 h, and dried at 130° C. for 3 h. The sample was heated to 460° C. along programmed temperature and calcined for 5 h to yield catalyst B, the physico-chemical properties of which are shown in Table 4.

EXAMPLE 15

110.2 g of the modified zeolite SSY4, 24.6 g of the modified zeolite β7, 85.7 g of amorphous silica-alumina, 66.2 g of macroporous alumina were placed in a comulling machine and comulled for 40 min. Then 242.3 g of a binder was added and the comulling was continued for 25 min. Afterwards, 200 ml of water was added and the comulling was carried out until an extrudable paste was formed. The paste was extruded into bars and the bars were dried at 130° C. for 4 h. The properties of the amorphous silica-alumina, macroporous alumina, and binder were the same as in Example 13. The dried bars were heated to 680° C. along programmed temperature, and calcined for 2.5 h to yield the support. The support was impregnated with an impregnation solution containing tungsten and nickel (the concentrations were the same as in Example 13) at ambient temperature for 8 h, and dried at 130° C. for 4 h. The sample was calcined at 530° C. for 3 h to yield catalyst C, the physico-chemical properties of which are shown in Table 4.

EXAMPLE 16

24.5 g of the modified zeolite SSY1, 61.5 g of the modified zeolite β8, 77.1 g of amorphous silica-alumina, 158.8 g of macroporous alumina were placed in a comulling machine and comulled for 30 min. Then 207.7 g of a binder was added and the comulling was continued for 35 min. Afterwards, 120 ml of water was added and the comulling was carried out until an extrudable paste was formed. The paste was extruded into bars and the bars were dried at 120° C. for 4 h. The properties of the amorphous silica-alumina, macroporous alumina, and binder were the same as in Example 13. The dried bars were heated to 630° C. along programmed temperature, and calcined for 3.5 h to yield the support. The support was impregnated with an impregnation solution containing tungsten and nickel (the concentrations were the same as in Example 13) at ambient temperature for 4 h, and dried at 110° C. for 4 h. The sample was calcined at 500° C. for 4.0 h to yield catalyst D, the physico-chemical properties of which are shown in Table 4.

EXAMPLE 17

The present example describes the results of the performance evaluation of the catalysts. Catalyst A of Example 13 was evaluated in a 200 ml fixed-bed hydrogenation unit. The properties of the used feed stock are shown in Table 5, and the evaluation results are shown in Table 6.

COMPARATIVE EXAMPLE 1

Catalyst E was a catalyst prepared according to the process as disclosed in an example of U.S. Pat No. 5,464,527. The zeolite was a rare earth exchanged zeolite-Y with a unit cell size of 24.30 Å, a silica to alumina molar ratio of 5.7. The content of the mixed rare earth in the zeolite was 5.5% by weight. The weight contents of various components in the catalyst were: the dispersed alumina silicate 50.5%; the binder, alumina, 14.5%; the rare earth zeolite-Y 7.2%; $WO_3$ 22.5%; NiO 5.3%. The evaluation results of catalyst E are shown in Table 6.

COMPARATIVE EXAMPLE 2

Catalyst F was prepared according to the process as disclosed in an example of U.S. Pat No. 5,536,687. The zeolite-Y had a unit cell size of 24.30 A, a crystallinity of 83%, a silica to alumina molar ratio of 5.7 and a specific area of 660 m²/g. The zeolite-β had a silica to alumina molar ratio of 23.5, a specific surface area of 731 m²/g, and a content of $Na_2O$ of 0.1% by weight. The weight contents of various components in the catalyst were: the zeolite-Y 15.0%; the zeolite-P 13.0%; NiO 5.1%; $MoO_3$ 18.1%. The specific surface area of the catalyst was 232 m²/g. The evaluation results of catalyst F are shown in Table 6.

TABLE 4

Physico-chemical properties of the catalysts of the present invention

| Catalyst No. | A | B | C | D |
|---|---|---|---|---|
| Composition of the supports, wt. % | | | | |
| Modified zeolite-SSY | 20 | 15 | 35 | 8 |
| Modified zeolite-β | 13 | 15 | 9 | 20 |
| Macroporous alumina | 30 | 10 | 15 | 35 |
| Amorphous silica-alumina | 15 | 40 | 20 | 18 |
| Microporous alumina | 22 | 20 | 21 | 19 |
| Property of the supports | | | | |
| Pore volume (ml/g) | 0.530 | 0.563 | 0.461 | 0.598 |
| Specific surface area (m²/g) | 393 | 370 | 458 | 363 |
| Composition and property of the catalyst | | | | |
| $WO_3$ (wt. %) | 22.8 | 19.6 | 24.6 | 26.2 |
| NiO (wt. %) | 5.6 | 4.8 | 5.3 | 6.6 |
| $SiO_2$ (wt. %) | 27.1 | 36.2 | 34.7 | 23.9 |
| $Al_2O_3$ (wt. %) | Balanced | Balanced | Balanced | Balanced |
| Pore volume (ml/g) | 0.361 | 0.413 | 0.328 | 0.402 |
| Specific surface area (m²/g) | 288 | 264 | 318 | 239 |

TABLE 5

Major properties of the feed stock

| Name of the feed stock | VGO |
|---|---|
| Density (20° C., g/cm³) | 0.9028 |
| Distillate range (° C.) | |
| IBP/50% | 298/426 |
| 95%/EBP | 531/551 |
| Carbon/hydrogen (wt. %) | 85.4/11.5 |
| Sulfur/nitrogen (wt. %) | 1.54/0.14 |
| Solidifying point (° C.) | 34 |
| Refractive index ($n_D^{70}$) | 1.4848 |
| Acidity value (mg KOH/g) | 0.24 |

TABLE 6

Comparative evaluation Results of the catalysts

| Catalyst | A | E | F |
|---|---|---|---|
| Feed stock | | VGO | |
| Hydrogen partial pressure (MPa) | | 14.7 | |
| Hydrogen/oil ratio (v/v) | | 1500:1 | |
| Volume space velocity (h⁻¹) | | 1.5 | |
| Reaction Temperature (° C.) | Base | Base + 12 | Base + 8 |
| One pass conversion (wt. %) | 69.6 | 69.4 | 68.6 |
| Distribution and major properties of the products | | | |
| Light naphtha | 2.1 | 2.4 | 2.6 |
| Yield (wt. %) | | | |
| Heavy naphtha | | | |
| Yield (wt. %) | 6.3 | 6.3 | 6.4 |
| Potential aromatics (wt. %) | 62.8 | 65.7 | 59.8 |
| Jet fuel | | | |
| Yield (wt. %) | 29.7 | 30.5 | 30.3 |
| Freezing point (° C.) | −59 | −54 | −60 |
| Smoking point (° C.) | 27 | 26 | 27 |
| Aromatics (wt. %) | 4.5 | 4.8 | 4.8 |
| Diesel | | | |
| Yield (wt. %) | 27.3 | 25.2 | 23.8 |
| Solidifying point (° C.) | Base | Base + 8 | Base + 6 |
| Cetane number | 58.1 | 58.8 | 56.8 |
| Selectivity to middle distillates (wt. %) | 81.9 | 80.3 | 78.9 |

It can be seen from the above comparative evaluation results in Table 6 that the catalyst of the present invention has high activity, high selectivity to middle distillates, and can produce diesel of low solidifying point. Compared to the comparative catalysts under the same conditions, the reaction temperature is 8–12° C. lower, the selectivity to middle distillates is 1.6 wt. %–3.0 wt. % higher, and the solidifying point of the diesel is 6–8° C. lower.

What is claimed is:

1. A midbarrel hydrocracking catalyst comprising a zeolite, which optionally comprises amorphous silica-alumina and/or alumina as a support, and at least one Group VIII metal and/or at least one Group VIB metal as an active component; comprising, on the basis of the catalyst weight, 4%–28% of a modified zeolite-Y and 4%–28% of a modified zeolite-β, wherein said zeolite-Y has a relative crystallinity of higher than 95%, a silica/alumina molar ratio of 9.0–30.6, an infrared acidity of 0.30–0.90 mmol/g with more than 95% of Bronsted acid, a unit cell size of $24.25 \times 10^{-10}$ m–$24.45 \times 10^{-10}$ m, a $Na_2O$ weight content of less than 0.16%; and said modified zeolite-β has a silica/alumina molar ratio of 85–153, a $Na_2O$ weight content of less than 0.15%, a relative crystallinity of 100–110% and an infrared acidity of 0.1–0.4 mmol/g.

2. The hydrocracking catalyst according to claim 1, wherein said catalyst comprises 0%–32% amorphous silica-alumina, 0%–32% macroporous alumina, and 12–18% microporous alumina.

3. The hydrocracking catalyst according to claim 2, wherein said catalyst comprises, on the basis of the catalyst weight, 10%–28% amorphous silica-alumina, 7%–28% macroporous alumina, and 13%–16% microporous alumina.

4. The hydrocracking catalyst according to claim 2, wherein said amorphous silica-alumina has a $SiO_2$ weight content of 20%–75%, an $Al_2O_3$ weight content of 25%–80%, and a pore volume of 0.5–1.1 ml/g and a specific surface area of 200–500 $m^2/g$.

5. The hydrocracking catalyst according to claim 2, wherein said amorphous silica-alumina has a $SiO_2$ weight content of 35%–60%, an $Al_2O_3$ weight content of 40%–65%, and a pore volume of 0.6–0.8 ml/g and a specific surface area of 280–500 $m^2/g$.

6. The hydrocracking catalyst according to claim 2, wherein said macroporous alumina has a pore volume of 0.6–1.2 ml/g, and a specific surface area of 200–550 $m^2/g$.

7. The hydrocracking catalyst according to claim 2, wherein said macroporous alumina has a pore volume of 0.8–1.2 ml/g, and a specific surface area of 300–500 $m^2/g$.

8. The hydrocracking catalyst according to claim 2, wherein said microporous alumina has a pore volume of 0.3–0.5 ml/g, and a specific surface area of 180–350 $m^2/g$.

9. The hydrocracking catalyst according to claim 1, wherein said catalyst comprises 15%–30% of at least one Group VIB metal oxide, and 3%–8% of at least one Group VIII metal.

10. The hydrocracking catalyst according to claim 9, wherein said catalyst comprises, on the basis of the catalyst weight, 18%–27% of at least one Group VIB metal oxide and 4%–7% of at least one Group VIII metal oxide.

11. The hydrocracking catalyst according to claim 1, wherein said modified zeolite-Y has a specific surface area of 680–850 $m^2/g$, and a pore volume of 0.30–0.55 ml/g.

12. The hydrocracking catalyst according to claim 1, wherein said modified zeolite-Y has a relative crystallinity of 100%–105%, a silica/alumina molar ratio of 10–20, and a $Na_2O$ weight content of less than 0.1%.

13. The hydrocracking catalyst according to claim 1, wherein said modified zeolite-Y is derived from zeolite-SSY by calcining the zeolite-SSY in the presence of steam at a temperature of 500° C.–750° C. under a vapor pressure of 0.01–0.30 MPa for 0.5–4 hours.

14. The hydrocracking catalyst according to claim 13, wherein said zeolite-SSY is prepared by a process comprising:
  (1) mixing a starting material of zeolite-Y with water to form a slurry, at a concentration of 5–30 g of starting material per 100 ml of the slurry;
  (2) heating the mixture of step (1) to a temperature of 50–120° C.;
  (3) adding thereto crystal ammonium hexafluorosilicate or a solution thereof, and reacting the mixture with stirring for 0.1–24 hours; and
  (4) separating the product by filtering,
  (5) washing the product with water; and
  (6) drying the product to obtain said zeolite-SSY.

15. The hydrocracking catalyst according to claim 14, wherein the concentration of the slurry of step (1) is that 100 ml of slurry contains 10–25 g of the starting material of zeolite-Y.

16. The hydrocracking catalyst according to claim 14, wherein the temperature in step (2) is 70–100° C. and the reaction time period in step (3) is 0.5–5 hours.

17. The hydrocracking catalyst according to claim 14, wherein in step (3) the amount of added ammonium hexafluorosilicate is at least 10 g per 100 g of the starting material of zeolite-Y, and the addition rate is up to 30 g per hour per 100 g of the starting material of zeolite-Y.

18. The hydrocracking catalyst according to claim 14, wherein in step (3) the amount of added ammonium hexafluorosilicate is 20–50 g per 100 g of the starting material of zeolite-Y, and the addition rate is 5–25 g per hour per 100 g of the starting material of zeolite-Y.

19. The hydrocracking catalyst according to claim 1, wherein said modified zeolite-β has a silica/alumina molar ratio of 102–136, a weight content of $Na_2O$ of less than 0.1%, a relative crystallinity of 100%–110%, and an infrared acidity of 0.2–0.3 mmol/g.

20. The hydrocracking catalyst according to claim 1, wherein said modified zeolite-β has a specific surface area of 400–750 $m^2/g$, and a pore volume of 0.25–0.50 ml/g.

21. The hydrocracking catalyst according to claim 1, wherein said modified zeolite-β has a specific surface area of 500–600 $m^2/g$, and a pore volume of 0.3–0.4 ml/g.

22. The hydrocracking catalyst according to claim 1, wherein said modified zeolite-β is obtained by a process comprising:
  (1) directly subjecting a slurry of a completely crystallized zeolite-β to ammonium salt exchange;
  (2) filtering the ammonium salt exchanged zeolite-β washing the filtered zeolite β with water, and drying and calcining the washed zeolite-β;
  (3) treating the dried zeolite-β with an acid, and and filtering and drying the acid-treated zeolite-β; and
  (4) subjecting the acid treated zeolite-β a pressurized steam calcination treatment.

23. The hydrocracking catalyst according to claim 22, wherein in step (3) after said acid treatment, ammonium salt is supplemented to the slurry of said zeolite-β to make the concentration of the ammonium salt in the slurry 0.2–0.6 mol/l, and then the slurry is filtered.

24. The hydrocracking catalyst according to claim 22, wherein in step (3) said zeolite-β is dried so that the zeolite-β contains 80%–90% by weight of dry material, then the zeolite-β is uniformly sprayed with water in the amount of 0.2–0.6 kg water/kg material, and then the zeolite-β is subjected to step (4).

25. The hydrocracking catalyst according to claim 1, wherein said catalyst comprises, on the basis of the catalyst weight, 4%–25% modified zeolite-β Y and 4%–18% modified zeolite-β.

26. The hydrocracking catalyst according to claim 1, wherein said catalyst has a specific surface area of 200–360 $m^2/g$, and a pore volume of 0.30–0.50 ml/g.

27. The hydrocracking catalyst according to claim 1, wherein said at least one metal of Group VIII is Co and/or Ni, and said at least one metal of Group VIB is Mo and/or W.

28. A process for preparing the hydrocracking catalyst according to claim 1, which comprises:
  (1) mixing defined amounts of said modified zeolite-Y, said modified zeolite-β, optional amorphous silica-alumina and macroporous alumina, microporous alumina, and an extrusion aid, forming a material by extrusion, and drying the material;
  (2) calcining the dried material of step (1) to yield the support; and
  (3) mpregnating the support of step (2) with an impregnation solution of the at least one Group VIII metal and/or the at least one Group VIB metal active components, and then drying, and (4) calcining to yield the catalyst.

29. The process according to claim 28, wherein in step (1) said modified zeolite-Y, modified zeolite-β, amorphous silica-alumina, macroporous alumina, and extrusion aid are put into a comulling machine and comulled for 20–40 mins, then microporous alumina is added thereto and the mixture is comulled for 25–40 mins, and then industrially pure water is added thereto and the mixture is comulled to form an extrudable paste which contains 38%–52% by weight of dry material, which is then formed into bars by extrusion and dried; and in step (2) the calcination is carried out at a program controlled temperature of 5000° C.–7000° C. for 2.5–6 hours.

30. The process according to claim 28, wherein in step (3) the impregnation of the support is saturation impregnation, super saturation impregnation, or complexing impregnation, which lasts for 1–12 hours; the impregnated support is then dried at a temperature of 100° C.–150° C. for 1–12 hours, and then calcined at a temperature of 450° C.–550° C. for 2.5–6.0 hours to obtain the catalyst.

* * * * *